United States Patent [19]

Ushiyama

[11] Patent Number: 4,775,787
[45] Date of Patent: Oct. 4, 1988

[54] MOTOR WITH PULSE ENCODER HAVING A COMPLETELY SHIELDED LIGHT RECEIVING ELEMENT

[75] Inventor: Shigeyuki Ushiyama, Hino, Japan
[73] Assignee: Fanuc Ltd., Yamanashi, Japan
[21] Appl. No.: 37,359
[22] PCT Filed: Jul. 18, 1986
[86] PCT No.: PCT/JP86/00371
  § 371 Date: Mar. 18, 1987
  § 102(e) Date: Mar. 18, 1987
[87] PCT Pub. No.: WO87/00620
  PCT Pub. Date: Jan. 29, 1987

[30] Foreign Application Priority Data

Jul. 19, 1985 [JP] Japan .................. 60-158349

[51] Int. Cl.[4] .................. G01D 5/34
[52] U.S. Cl. .................. 250/231 SE; 250/237 G
[58] Field of Search .................. 174/51; 250/231 SE, 250/237 G; 340/347 P; 356/395; 33/125 C

[56] References Cited

U.S. PATENT DOCUMENTS

| | | | |
|---|---|---|---|
| 3,790,858 | 2/1974 | Brancaleone et al. | 174/51 |
| 4,342,909 | 8/1982 | Accattino | 250/231 SE |
| 4,389,902 | 6/1983 | Kataoka et al. | 250/231 SE |
| 4,654,636 | 3/1987 | Rusk | 340/347 P |
| 4,661,698 | 4/1987 | Cappio et al. | 250/237 G |

Primary Examiner—David C. Nelms
Assistant Examiner—William L. Oen
Attorney, Agent, or Firm—Armstrong, Nikaido, Marmelstein & Kubovcik

[57] ABSTRACT

A motor equipped with a pulse encoder, the motor equipped with a pulse encoder being characterized in that: the rear housing portion of the motor is formed of an insulator; the pulse encoder comprises a light emitting unit, a light receiving element unit for receiving light from the light emitting unit, a rotary encoder disc and a fixed encoder disc having signal patterns which pass or interrupt light sent from the light emitting unit to the light receiving element unit, a fixed slit plate to which the fixed encoder disc and the light receiving element unit are affixed, and a printed circuit board on which is formed the signal processing circuit to which the signal output from the light receiving element unit is input through connection lines, the fixed slit plate being affixed to the rear housing portion of the motor; the fixed slit plate is electrically connected to the $0_V$ terminal of the printed circuit board through an earth pattern formed on the light receiving element unit and a connection line; and a cover electrically connected to the $0_V$ terminal of the printed circuit board is used to cover the pulse encoder.

3 Claims, 5 Drawing Sheets

MOTOR WITH PULSE ENCODER HAVING A COMPLETELY SHIELDED LIGHT RECEIVING ELEMENT

TECHNICAL FIELD

The present invention relates to a motor equipped with a pulse encoder, more particularly to a motor equipped with a pulse encoder used for detecting the speed or position (rotational angle) of the motor. It is used for control of the movement of robot arms, control of the feed of machine tool work tables, etc. and further for the positioning of the wire in a wire cut electric discharge machine tool.

BACKGROUND ART

The conventional version of this type of pulse encoder comprises a light emitting diode or other light emitting unit, a light receiving element unit having a PN type photodiode or other light receiving element for receiving light from the light emitting unit, a rotary encoder disc and a fixed encoder disc having signal patterns which pass or interrupt light sent from the light emitting unit to the light receiving element unit. A fixed slit plate has the fixed encoder disc and the light receiving element unit affixed. A housing has the fixed slit plate affixed, and a printed circuit board on which is formed the signal processing circuit (comparator, driver, TTL, etc.) to which the signal output from the light receiving element unit is input through connection lines.

However, in this type of pulse encoder, the signal output from the light receiving element unit is on the high order of several hundred mV, so the signal, in the process of passing from the light receiving element to the amplifier on the printed circuit board (for example, the comparator) is particularly susceptible to noise. Therefore, the signal output to the outside of the pulse encoder often is not correct and thus mistaken operations are caused.

However, the major reason why noise easily superposes on the output signal output from the light receiving element unit is that the fixed slit plate, to which the light receiving element unit is affixed, is made of metal (usually, a metal the same as that of the housing to which said fixed slit plate is affixed). Therefore, the high frequency noise from the circuit for supplying power to the motor, in particular from a circuit controlled by chopping, passes via the case of the motor, the housing, which abuts against an end of the motor case and in which is mounted the bearings supporting the rotary shaft of the motor, to reach the fixed slit plate affixed to the housing. Thus, the fixed slit plate serves as a source of noise.

As a means for reducing the noise, in the prior art, as for example illustrated in FIG. 1, the means has been adopted of connecting a capacitor 104 to the portion (portion of input circuit of comparator 105 in FIG. 1) of the signal processing circuit (comprised of comparator 105, driver 106, etc.) on the printed circuit board 10, to which portion the signal is input from the light receiving element unit 8, where the light receiving elements 82 and 83 are provided, through the connection lines 103, the capacitor 104 absorbing noise included in the signal output from the light receiving element unit 8.

However, with the capacitor 104, both the noise and also the regular output signal are absorbed. In cases, for example, where the motor is rotating at a high speed or where the slits for the signal patterns formed on the rotary encoder disc are narrow (i.e., there are a large number of pulses), when the frequency of the output signal is high, there is a conspicuous rounding of the output signal due to the influence of the capacitor and there is thus the problem of possible failure to obtain a correct signal as the rectangular wave signal on the comparator output side.

Further, even when the fixed slit plate is not made a metal, but of an insulator, about the same thing happens as when it is made of metal, i.e., an electric field created by the high frequency noise is formed through the insulator on the light receiving element unit side. There is a problem in that this type of noise reduction measure is not sufficiently effective.

To solve the above-mentioned problems, the present applicant previously proposed a pulse encoder provided, as shown in FIG. 2 and FIG. 3, with a light emitting unit (for example, a light eitting diode 101), a light receiving element unit 8 for receiving light from the light emitting unit, a rotary encoder disc 9 and a fixed encoder disc 72 having signal patterns which pass or interrupt light sent from the light emitting unit to the light receiving element unit 8, a fixed slit plate 7 to which the fixed encoder disc 72 and the light receiving element unit 8 are affixed, a housing 61 to which the fixed slit plate 7 is affixed, and a printed circuit board 10 on which is formed the signal processing circuit to which signal output from the light receiving element unit 8 is input through connection lines 103. The fixed slit plate 7 is affixed in an electrically insulated state to the housing 61 through, for example, an insulating spacer 71. The fixed slit plate 7 and an earth or ground pattern formed on the light receiving element unit 8 are electrically connected by a fixing screw 82 of the light receiving element unit 8. The ground pattern of the light receiving element unit 8 is electrically connected to the $0_V$ terminal of the printed circuit board 10 by the connection lines 103 (Japanese Patent Application No. 59-249757, Japanese Unexamined Patent Publication (Kokai) No. 61-128122).

Note that in FIG. 2, and FIG. 3, reference numeral 62 is a shaft of the pulse encoder, which is connected to the motor shaft. The end of the shaft, which is supported by bearings mounted in the housing 61, is shown in a state protruding from the top of the housing. To its top portion 63 is affixed by adhesion the rotary encoder disc 9. Reference numeral 76 is a stopscrew for affixing the fixed slit plate 7 through the insulating spacer 71 to the housing 61. Between the fixed slit plate 7 and the stopscrew 76 is interposed an insulating bushing 75. Reference numerals 102 are fastening screws for fastening the printed circuit board 10 to the housing 61.

According to this construction, the potential of the metal fixed slit plate is stabilized at zero potential. The fixed slit plate thus fractions to electrically "shield" out effects of high frequency noise transmitted from the housing side (absorb lines of electric force flowing in from the housing side). Therefore, the signal output from the light receiving element unit affixed to the fixed slit plate is made free from the high frequency noise. The noise resistance in the pulse encoder could therefore be sufficiently strengthened to enable principal detection of the rotational angle, rotational speed etc. of servo motors to read the position and movement of robot arms, the feed of machine tool work tables, etc.

However, when a motor provided with a pulse encoder such as mentioned above is used for positioning the wire in a wire cut electric discharge machine tool, for example, high frequency noise is created not only by the circuit for supplying power to the motor, but also the current flowing through the wire. There are strong effects by this high frequency noise as well.

Therefore, when the above-mentioned pulse encoder is used for positioning in an electric discharge machine tool, the insulating spacer interposed between the housing and the fixed slit plate must be made considerably thick or else it would be difficult to sufficiently reduce the effects of the high frequency noise in the light receiving element unit side. Further, the effects of the high frequency noise from the portion of the housing not covered by the insulating spacer (for example, the lower half portion of the housing 61 shown in FIG. 3) cannot be neglected.

DISCLOSURE OF THE INVENTION

The present invention was made to resolve the above-mentioned problems. It has the rear housing portion of the motor, where the pulse encoder is provided, formed of an insulator. The fixed slit plate of the pulse encoder is directly affixed to the rear housing portion made of the insulator. The fixed slit plate is electrically connected through the ground pattern formed on the light receiving element unit and through the connection line to the $0_V$ terminal of the printed circuit board. A cover is electrically connected to the $0_V$ terminal of the printed circuit board which is used to cover the pulse encoder. Based on this idea, it reduces much more the noise included in the signal output from the light receiving element unit.

To resolve the above-mentioned problems, the present invention provides a motor equipped with a pulse encoder. The motor equipped with a pulse encoder is characterized in that:

the rear housing portion of the motor is formed of an insulator;

the pulse encoder comprises a light emitting unit, a light receiving element unit for receiving light from the light emitting unit, a rotary encoder disc and a fixed encoder disc having signal patterns which pass or interrupt light sent from the light emitting unit to the light receiving element unit, a fixed slit plate to which the fixed encoder disc and the light receiving element unit are affixed, and a printed circuit board on which is formed the signal processing circuit to which the signal output from the light receiving element unit is input through connection lines, the fixed slit plate being affixed to the rear housing portion of the motor;

the fixed slit plate is electrically connected to the $0_V$ terminal of the printed circuit board through a ground pattern formed on the light receiving element unit and a connection line; and a cover is electrically connected to the $0_V$ terminal of the printed circuit board is used to cover the pulse encoder.

According to this construction, the light receiving element unit mounted on the fixed slit plate is completely insulated from the motor side (completely floated) and the fixed slit plate and cover, which surround the light receiving element unit and the connection lines connecting the light receiving element unit and printed circuit board, are both connected to the $0_V$ terminal of the printed circuit board, so the surroundings of the light receiving element unit and the connection lines are almost completely enclosed by zero potential metal bodies, these zero potential metal bodies being used to almost completely shield out the effects of high frequency noise transmitted from the motor side, whereby the effects of the high frequency noise on signals output from the light receiving element unit can be reduced much more.

BEST MODE FOR CARRYING OUT THE INVENTION

Below, an embodiment of the motor equipped with a pulse encoder according to the present invention will be explained with reference to FIG. 4 to FIG. 9.

Figure 1:
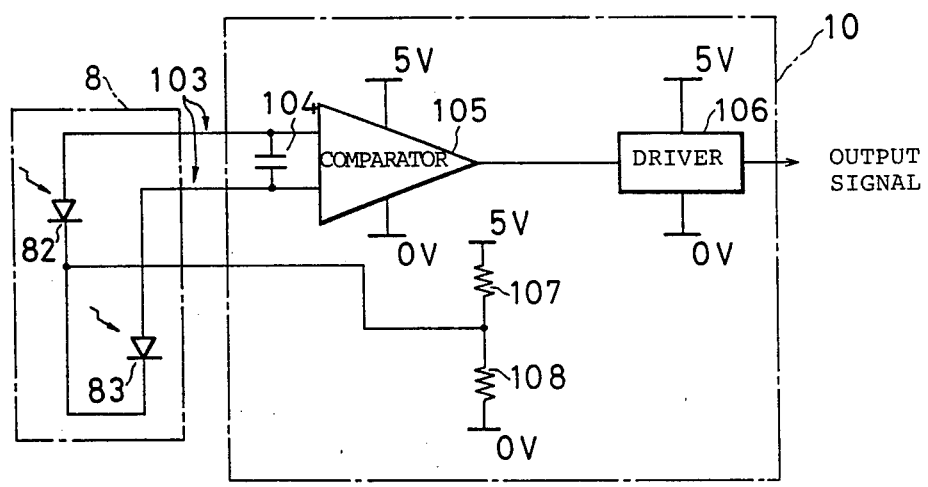
FIG. 1 is a view showing the signal processing circuit of a pulse encoder according to one example of the preceding art.
Figure 2:
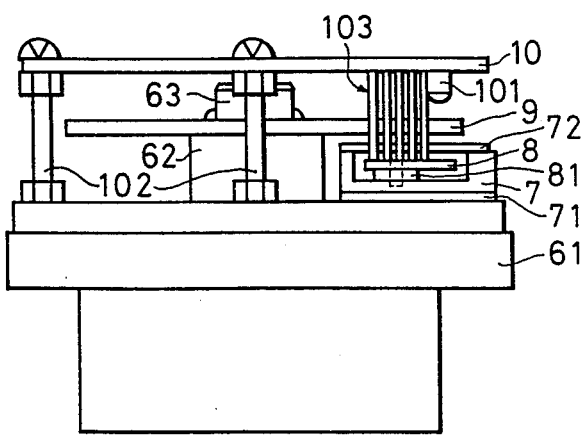
FIG. 2 is a view showing the overall construction of this type of pulse encoder as another example of the preceding art.
Figure 3:
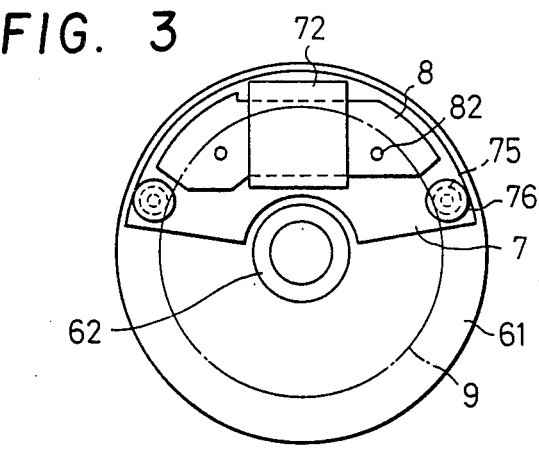
FIG. 3 is a plane view of the pulse encoder shown in FIG. 2 showing the bottom surface from the fixed encoder disc.
Figure 4:
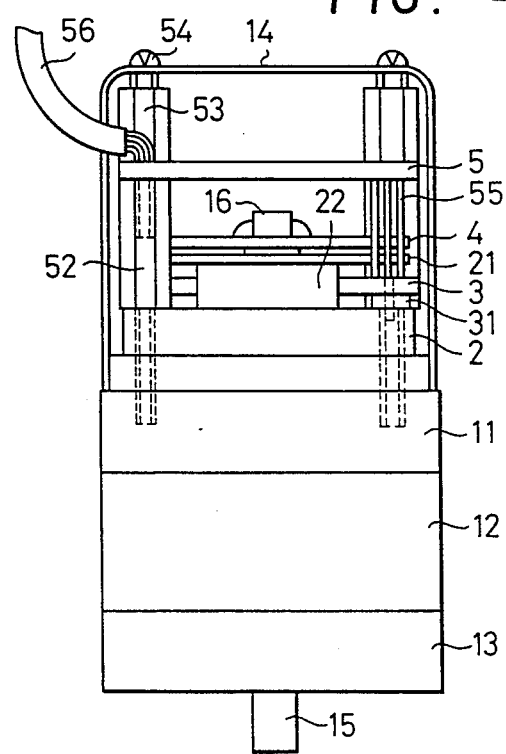
FIG. 4 is a view showing the overall construction of a motor provided with a pulse encoder according to the present invention.
Figure 5:
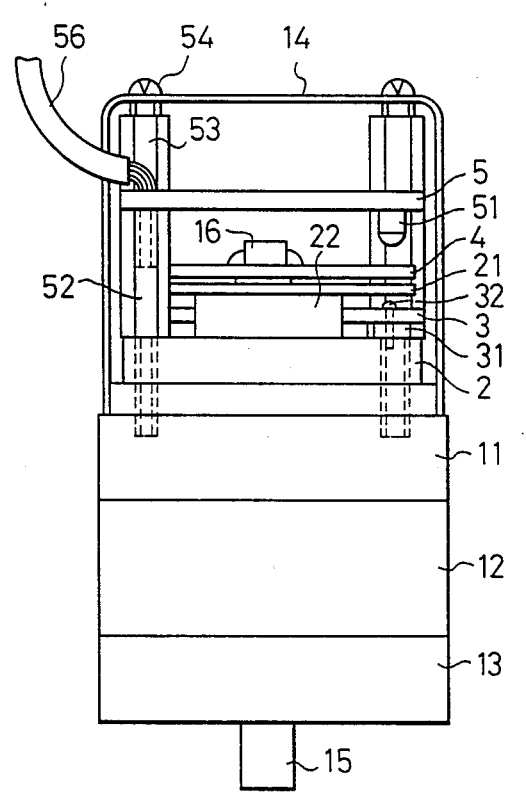
FIG. 5 is a view of the motor provided with the pulse encoder shown in FIG. 4 showing the state with the connection lines connecting the light receiving element unit and printed circuit board removed.
Figure 6:
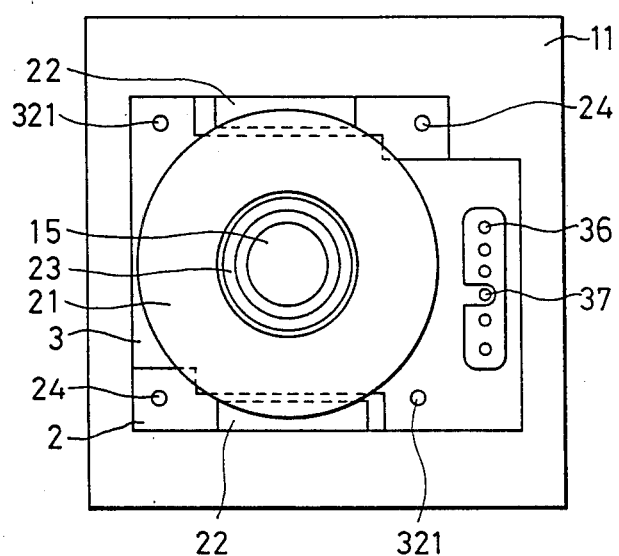
FIG. 6 is a plane view of the motor provided with the pulse encoder shown in FIG. 4 showing the bottom surface from the fixed encoder disc.

FIG. 4 is a schematic view showing the overall construction of a motor provided with the pulse encoder. FIG. 5 shows the state without the connection lines 55 for supplying signals output from the light receiving element unit 3 in FIG. 4 to the signal processing circuit (comparator, driver, TTL, etc.) formed on the printed circuit board 5.

Reference numerals 11, 12, and 13 are the rear, center, and front portions of the housing, which comprise the motor housing. In the rear housing portion 11 and front housing portion 13 are mounted the bearings supporting the motor shaft 15. In the center housing 12 is mounted the stator. One end of the motor shaft 15 protrudes from the top surface of the rear housing portion 11 and passes through the fixed slit plate 2 and a ring protrusion 23 provided at the top center thereof (see FIG. 9), the top end 16 thereof having attached by adhesion thereto the rotary encoder disc (the rotary disc formed with slits of a predetermined shape along the circumference thereof) 4.

Figure 9:
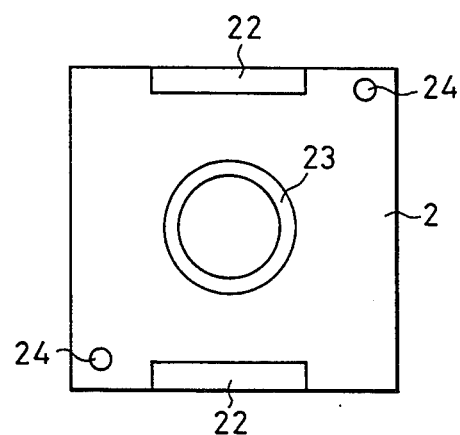
FIG. 9 is a plane view of a fixed slit plate provided in the pulse encoder shown in FIG. 4.

Note that the rear housing portion 11 is formed by an insulator. For example, use is made of phenolic resins, bakelite, etc. Reference numeral 2 is a fixed slit plate provided on the rear housing portion 11, spacer bolts 52 being screwed into two screw holes 24 provided on the diagonal line thereof so as to affix the plate to the rear housing portion 11. Note that FIG. 9 shows the plane view of the fixed slit plate 2. As shown in FIG. 9 the fixed slit plate 2 is provided on its top surface with two projections 22 on the two sides and at its center with the above-mentioned ring-shaped protrusion 23. As mentioned above, one end of the motor shaft 15 is passed through the ring-shaped protrusion 23.

Reference numeral 21 is a fixed encoder disc affixed by adhesion on the projections 22 provided at the two side portions of the fixed slit plate 2. Reference numeral 3 is a light receiving element unit, which is provided under the fixed encoder disc 21 on the top surface of the fixed slit plate 2, screws 32 being screwed into two screw holes 321 provided on the diagonal line thereof so as to affix the light receiving element unit to the fixed slit plate 2. Note that, between the fixed slit plate 2 and the light receiving element unit 3, a metal washer 31, for example, is interposed.

Reference numeral 5 is a printed circuit board which is attached, by screwing each of other spacer bolts 53 above each of the above-mentioned two spacer bolts 52, between the spacer bolts 52 and 53, the printed circuit board 5 having attached thereto a light emitting diode 51, the light from the light emitting diode 51 passing through the rotary encoder disc 4 and fixed encoder disc 21 to be received by a light receiving element unit 3, the signals output from the light receiving elements due to the same passing through the connection lines 55 to be supplied to the signal processing circuit (comparator, driver, TTL, etc.) formed on the printed circuit board 5.

The rear housing portion 11 of the motor is provided with a metal cover 14 which covers the entire pulse encoder unit, the metal cover 14 being affixed by stopscrews 54 to the spacer bolts 53. Note that reference numeral 56 is a cable for connection of the outside to the signal processing circuit on the printed circuit board.

Below, an explanation will be made of the specific means of the present invention for connecting the fixed slit plate 2 and cover 14 to the power supply $0_V$ terminal provided on the printed circuit board 5. Note that FIG. 7 shows an enlarged plane view of the light receiving element unit 3 and that FIG. 8 shows a schematic sectional view thereof.

Figure 7:
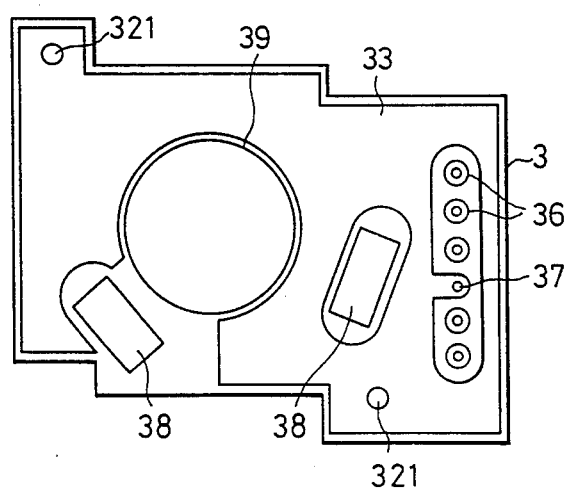
FIG. 7 is a plane view of a light receiving element unit provided in the pulse encoder shown in FIG. 4.

As shown in FIG. 7, on the surface of the light receiving element unit 3 (comprised of the substrate on which is mounted the light receiving element unit 38) is formed an earth or ground pattern 33 formed by an electroconductive coating. A predetermined number of light receiving elements (for example, PN type photodiodes) 38 are provided at a distance from the earth pattern 33. Further, there are provided an earth or ground terminal 37 connected to the earth pattern 33 and a predetermined number of signal terminals 36 provided at a distance from the earth pattern 33 for connecting the signal lines led out from the light receiving elements 38 to the connection lines 55. Note that the ring-shaped protrusion 23 of the fixed slit plate 2 passes through a hole 39 provided at the center portion. (See FIG. 6).

Figure 8:
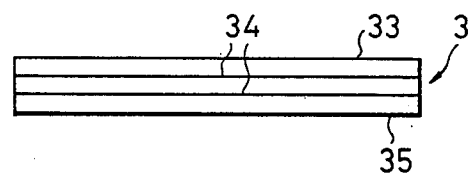
FIG. 8 is a view schematically showing a section of the light receiving element unit shown in FIG. 7.

Further, the light receiving element unit 3 has, as shown in FIG. 8, another earth pattern 35 formed on its reverse surface. The earth pattern 35 of the reverse surface is, for example, connected through a throughhole to the earth pattern 33 of the front surface. Reference numeral 34 is a pattern of signal wiring for connecting the respective light receiving elements 38 to the predetermined signal terminals 36. In this way, the signal wiring pattern 34 is formed in a manner sandwiched between the front and reverse surface earth patterns 33 and 35 as an intermediate layer of the light receiving element unit 3. That is, the signal wirings led out from the light receiving elements 38 are formed as the predetermined pattern 34 in the intermediate layer through the throughhole and again pass through the throughhole to be led to the respective signal terminals 36 formed on the front surface, for example. The signal wiring pattern 34 formed as the intermediate layer in this way is shielded also by the earth patterns 33 and 35 formed on its front and reverse surfaces.

By affixing the light receiving element unit 3 on the fixed slit plate 2 through the metal washers 31 by the stopscrews 32, the fixed slit plate 2 and the earth pattern 35 on the reverse surface of the light receiving element unit are electrically connected. Therefore, the fixed slit plate 2 is electrically connected via the earth pattern 35 formed on the reverse surface of the light receiving element unit and further via the throughhole etc. to the earth terminal 37 connected with the above-mentioned earth pattern of the light receiving element unit 3. Further, the earth terminal 37 of the the light receiving element unit 3 and the power supply $0_V$ terminal of the above-mentioned printed circuit board 5 are electrically connected by one of the connection lines 55. By this, in the end, the fixed slit plate 2 is connected to the power supply $0_V$ terminal of the printed circuit board 5.

On the other hand, the cover 14 for covering the entire pulse encoder unit is affixed to the spacer bolts 53 by fastening screws 54. Therefore, the end faces of the spacer bolts 53 are made to abut against the earth pattern (connected to the power supply $0_V$ terminal) formed on the front surface of the printed circuit board 5, whereby the cover 14 is also connected to the power supply $0_V$ terminal of the printed circuit board 5.

In this way, the light receiving element unit 3 is completely insulated from the motor side and the fixed slit plate and cover, which enclose the light receiving element unit and the connection lines connecting the light receiving element unit and printed circuit board, are both connected to the power supply $0_V$ terminal on the printed circuit board, whereby the surroundings of the light receiving element unit and the connection lines are almost completely shielded by zero potential metal bodies and whereby the effects of the high frequency noise on signals output from the light receiving element unit can be almost completely eliminated.

Further, in the above-mentioned embodiment, the light receiving element unit itself also has earth patterns formed on its front and reverse surfaces and signal wirings led out from the light receiving elements are arranged in a sandwich fashion between the earth patterns of the front and reverse surfaces, so that the signal wiring portion is shielded more reliably from the outside.

Note that in the above-mentioned embodiment, the end portion of the motor shaft is also enclosed by the ring-shaped protrusion 23 provided at the center of the fixed slit plate 2, so the effects resulting from the end portion of the motor shaft 31 protruding from the top surface of the rear housing portion 11 also can be almost completely ignored.

According to the present invention, the surroundings of the light receiving element unit and the connection lines connecting the light receiving element unit and printed circuit board are almost completely enclosed by zero potential metal bodies and the effects of high frequency noise conveyed from the motor side can be almost completely shielded out, so the effects of high frequency noise on signals output from the light receiving element unit can be almost completely eliminated.

Therefore, for example, even in applications for motors for positioning wires in wire cut electric discharge machine tools, it is possible to completely eliminate mistaken operations of the pulse encoder arising from the high frequency noise.

By way of reference, according to the present invention, the noise resistance level of the pulse encoder rises remarkably. In the prior art type where no noise resistance measures were taken, mistaken operations would occur at a noise level (usually measured between the motor case and $0_V$ terminal of the printed circuit board) of about 10V. On the other hand, according to the present invention, it is possible to raise the noise level of the encoder to about 400V.

I claim:

1. A motor equipped with a pulse encoder, said motor equipped with a pulse encoder comprising:

a rear housing portion of said motor is formed of an insulator;

said pulse encoder comprises a light emitting unit, a light receiving element unit for receiving light from said light emitting unit, a rotary encoder disc and a fixed encoder disc having signal patterns which pass or interrupt light sent from said light emitting unit to said light receiving element unit, a fixed slit plate to which said fixed encoder disc and said light receiving element unit are affixed, and a printed circuit board on which is formed the signal processing circuit to which the signal output from said light receiving element unit is input through connection lines, said fixed slit plate being affixed to the rear housing portion of said motor;

said fixed slit plate is electrically connected to the $0_V$ terminal of said printed circuit board through a ground pattern formed on said light receiving element unit and a connection line; and a cover, electrically connected to the $0_V$ terminal of said printed circuit board, is used to cover said pulse encoder.

2. A motor equipped with a pulse encoder according to claim 1, wherein said cover is electrically connected through spacer bolts provided between said cover and said printed circuit board to the $0_V$ terminal of said printed circuit board.

3. A motor equipped with a pulse encoder according to claim 1, wherein said light receiving element unit has ground patterns formed on its front and reverse surfaces and a wiring pattern of signal lines formed in an intermediate layer sandwiched between said ground patterns.

* * * * *